United States Patent
Baehrle-Miller et al.

(10) Patent No.: US 11,325,574 B2
(45) Date of Patent: *May 10, 2022

(54) BRAKE SYSTEM CONTROL DEVICE FOR A VEHICLE

(71) Applicant: Robert Bosch GmbH, Stuttgart (DE)

(72) Inventors: Frank Baehrle-Miller, Schoenaich (DE); Peter Rebholz-Goldmann, Yokohama (JP)

(73) Assignee: Robert Bosch GmbH, Stuttgart (DE)

( * ) Notice: Subject to any disclaimer, the term of this patent is extended or adjusted under 35 U.S.C. 154(b) by 201 days.

This patent is subject to a terminal disclaimer.

(21) Appl. No.: 16/332,228

(22) PCT Filed: Aug. 14, 2017

(86) PCT No.: PCT/EP2017/070564
§ 371 (c)(1),
(2) Date: Mar. 11, 2019

(87) PCT Pub. No.: WO2018/054608
PCT Pub. Date: Mar. 29, 2018

(65) Prior Publication Data
US 2019/0270440 A1  Sep. 5, 2019

(30) Foreign Application Priority Data

Sep. 22, 2016  (DE) ..................... 10 2016 218 229.3

(51) Int. Cl.
*B60T 13/74* (2006.01)
*B60T 13/58* (2006.01)
(Continued)

(52) U.S. Cl.
CPC .............. *B60T 13/588* (2013.01); *B60T 8/17* (2013.01); *B60T 8/88* (2013.01); *B60T 8/885* (2013.01);
(Continued)

(58) Field of Classification Search
CPC .... B60T 13/745; B60T 13/662; B60T 13/686; B60T 13/741; B60T 8/4077;
(Continued)

(56) References Cited

U.S. PATENT DOCUMENTS

| 5,752,748 A | 5/1998 | Schramm et al. |
| 10,207,693 B2 * | 2/2019 | Baehrle-Miller ......... B60T 7/12 |

(Continued)

FOREIGN PATENT DOCUMENTS

| CN | 102164792 A | 8/2011 |
| CN | 103167976 A | 6/2013 |

(Continued)

OTHER PUBLICATIONS

International Search Report corresponding to PCT Application No. PCT/EP2017/070564, dated Oct. 19, 2017 (German and English language document) (7 pages).

*Primary Examiner* — Robert A. Siconolfi
*Assistant Examiner* — Stephen M Bowes
(74) *Attorney, Agent, or Firm* — Maginot, Moore & Beck LLP

(57) ABSTRACT

A brake system control device for a vehicle that has a hydraulic vehicle brake and an electromechanical brake device with at least one electric brake motor includes a microcontroller for actuating at least one active brake component. The brake system control device further includes a system ASIC for detecting wheel revolution rate signals and a brake motor ASIC for actuating the electric brake motor of the electromechanical brake device. The brake motor ASIC includes wheel revolution rate signals that are configured to be detected and the microcontroller is connected to the system ASIC and the brake motor ASIC via communications interfaces.

10 Claims, 3 Drawing Sheets

(51) Int. Cl.
   *B60T 8/17*  (2006.01)
   *B60T 8/88*  (2006.01)
   *B60T 13/66*  (2006.01)
   *B60T 13/68*  (2006.01)
   *B60T 17/22*  (2006.01)
   *B60T 8/32*  (2006.01)

(52) U.S. Cl.
   CPC .......... *B60T 13/662* (2013.01); *B60T 13/686* (2013.01); *B60T 13/74* (2013.01); *B60T 13/741* (2013.01); *B60T 17/22* (2013.01); *B60T 8/32* (2013.01); *B60T 2270/402* (2013.01); *B60T 2270/413* (2013.01)

(58) Field of Classification Search
   CPC . B60T 8/4827; B60T 8/88; B60T 8/92; B60T 8/94; B60T 227/402; B60T 227/403; B60T 227/406; B60T 227/414; B60W 2520/28; B60W 2720/28
   See application file for complete search history.

(56) References Cited

U.S. PATENT DOCUMENTS

| | | | |
|---|---|---|---|
| 10,246,070 B2* | 4/2019 | Baehrle-Miller | B60T 13/741 |
| 2002/0072836 A1* | 6/2002 | Weiberle | B60T 13/662 |
| | | | 701/29.7 |
| 2002/0103584 A1* | 8/2002 | Babala | G01L 15/00 |
| | | | 701/29.2 |
| 2006/0212135 A1* | 9/2006 | Degoul | B60T 8/3255 |
| | | | 700/9 |
| 2011/0172866 A1* | 7/2011 | Doerr | B60L 7/26 |
| | | | 701/22 |
| 2012/0090928 A1* | 4/2012 | Roll | B60T 7/042 |
| | | | 188/106 R |
| 2015/0251639 A1 | 9/2015 | Sautter et al. | |
| 2016/0114779 A1* | 4/2016 | Binder | B60T 13/686 |
| | | | 701/76 |
| 2017/0217413 A1* | 8/2017 | Kutzner | B60T 8/172 |
| 2017/0320487 A1* | 11/2017 | Greene | B60W 10/18 |
| 2018/0001875 A1* | 1/2018 | Houtman | B60T 11/18 |

FOREIGN PATENT DOCUMENTS

| | | | |
|---|---|---|---|
| CN | 104192118 A | 12/2014 | |
| DE | 100 06 656 C1 | 6/2001 | |
| DE | 102 11 280 A1 | 9/2003 | |
| DE | 10 2008 010 094 A1 | 8/2009 | |
| DE | 102008010094 A1 * | 8/2009 | ............ B60T 8/321 |
| DE | 10 2011 084 534 A1 | 4/2012 | |
| DE | 10 2014 204 287 A1 | 9/2015 | |
| DE | 10 2015 204 757 A1 | 9/2016 | |
| JP | H09-505251 A | 5/1997 | |
| JP | 2015-051672 A | 3/2015 | |
| KR | 10-2013-0133191 A | 12/2013 | |
| KR | 10-1633147 B1 | 7/2016 | |
| WO | 2006/045841 A1 | 5/2006 | |
| WO | 2010/034676 A1 | 4/2010 | |

\* cited by examiner

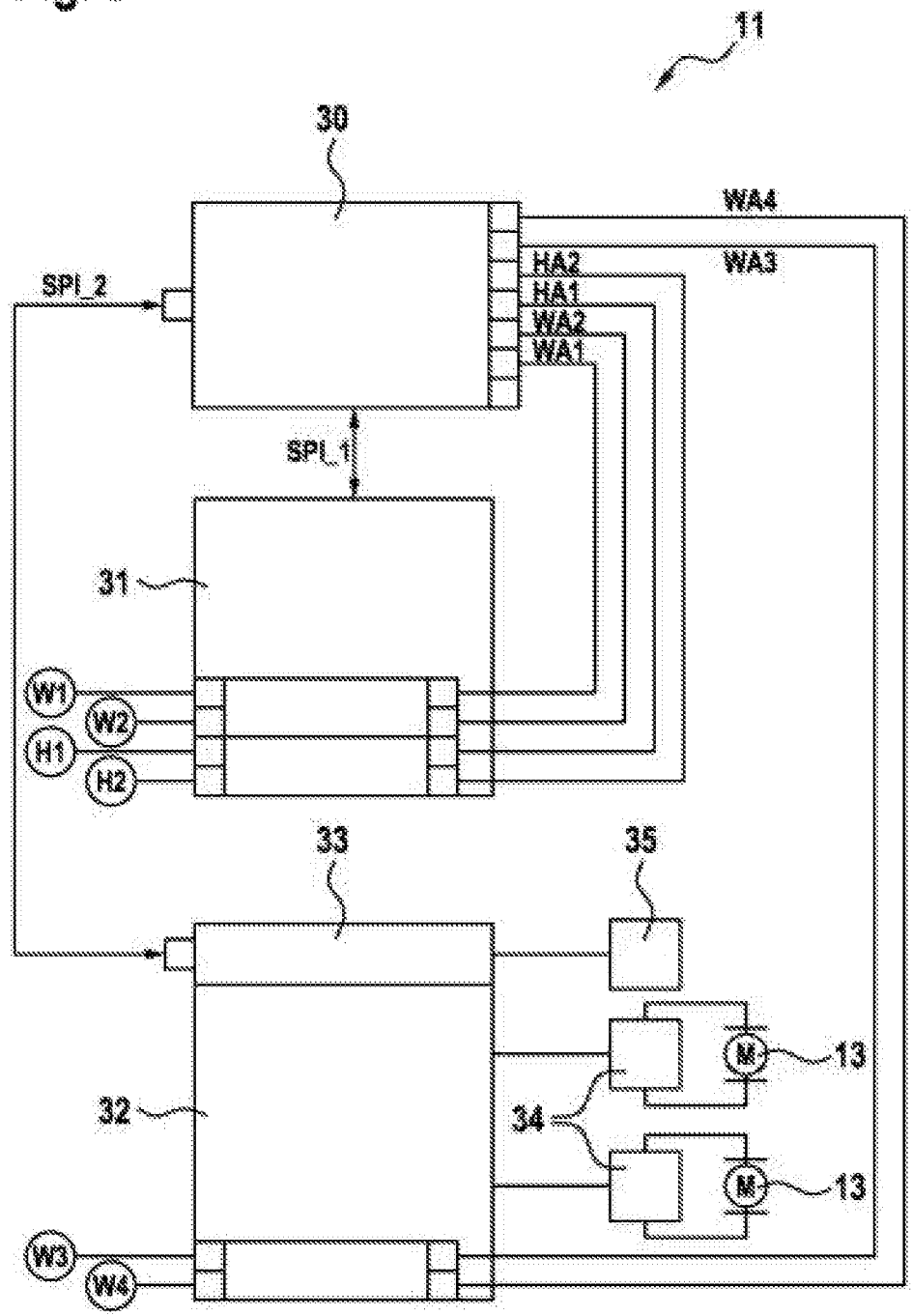

BRAKE SYSTEM CONTROL DEVICE FOR A VEHICLE

This application is a 35 U.S.C. § 371 National Stage Application of PCT/EP2017/070564, filed on Aug. 14, 2017, which claims the benefit of priority to Serial No. DE 10 2016 218 229.3, filed on Sep. 22, 2016 in Germany, the disclosures of which are incorporated herein by reference in their entirety.

The disclosure concerns a brake system control device for a vehicle with a hydraulic vehicle brake and with an electromechanical brake device comprising at least one electric brake motor.

BACKGROUND

In DE 10 2014 204 287 A1, a brake system control device for a vehicle is described that is equipped with a hydraulic vehicle brake and an electromechanical parking brake with two electric brake motors on the wheels of the rear axle. By means of the control device, the brake system can be automatically actuated such that the electric brake motors can be actuated in a normal operating mode, for example to carry out a parking process. In a safety operating mode on the other hand, activation of the electric brake motors is prevented. The safety operating mode is set up during regular driving operation in order to prevent the parking brake from being activated inadvertently while travelling.

SUMMARY

The brake system control device according to the disclosure can be used in vehicles with a brake system comprising a hydraulic vehicle brake and an electromechanical brake device with at least one electric brake motor, for example two electric brake motors. The control device comprises a microcontroller, by means of which at least one, preferably a plurality of active brake components can be actuated, for example an electrically controllable actuator for influencing the hydraulic pressure in the hydraulic vehicle brake. Furthermore, the control device comprises a system ASIC (application-specific integrated circuit) for detecting wheel revolution rate signals that can be fed as speed information to the microcontroller. Moreover, the control device comprises a brake motor ASIC that is separate from the system ASIC for actuating the at least one electric brake motor of the electromechanical brake device. Wheel revolution rate signals are also detected in the brake motor ASIC. The microcontroller is connected to both the system ASIC and the brake motor ASIC via communications interfaces.

Vehicle speed information is thus present in both ASICs and can be transmitted to the microcontroller via the communications interfaces. Thus the wheel revolution rate information is available to the microcontroller via the system ASIC and the brake motor ASIC, which obtain said information from the wheel revolution rate sensors on the vehicle wheels via further interfaces.

Said implementation has the advantage that the electromechanical brake device with the at least one electric brake motor can be actuated even in the event of a failure of the microcontroller, the system ASICs or a communications interface between the microcontroller and the system ASIC or between the microcontroller and the brake motor ASIC. The failure of a component of the control device does not affect the brake motor ASIC, which can actuate the at least one electric brake motor independently of the microcontroller. The actuation is carried out in particular depending on the speed; because the speed information about the wheel revolution rate signals is present in the brake motor ASIC, said ASIC can determine the speed of the vehicle from the wheel revolution rate signals and accordingly can actuate the brake motor depending on the speed. The brake motor of the electromechanical brake device may be triggered automatically—without driver operation—by means of the brake motor ASIC in order to produce a braking force for decelerating the vehicle additionally or alternatively to the hydraulic vehicle brake. It is however also possible to trigger the actuation of the electromechanical brake device manually, even if a component of the control device has failed, as long as the brake motor ASIC is working.

In the normal case—with a working control device without a component failure—the regular braking process is preferably carried out exclusively by means of the hydraulic vehicle brake in order to decelerate the vehicle. The electromechanical brake device is advantageously only used as a parking brake in order to produce a braking force that holds the vehicle at a standstill. However, even in the normal case the electromechanical brake device may be actuated in support of the hydraulic vehicle brake in order to produce an electromechanical braking force in addition to the hydraulic braking force. In the normal case, the activation of the electric brake motor is carried out by means of a corresponding activation signal of the microcontroller, which is transmitted to the brake motor ASIC via the communications interface.

The electromechanical brake device is preferably integrated in one or more wheel brake devices of the hydraulic vehicle brake. In this implementation, the brake pistons in the wheel brake device can be displaced towards the brake disk both by hydraulic brake fluid of the hydraulic vehicle brake and at the same time or mutually independently by the electric brake motor. According to an advantageous implementation, the electromechanical brake device comprises an electric brake motor on both wheel brake devices on the rear axle of the vehicle.

According to a further advantageous implementation, the wheel revolution rate signals in the system ASIC and the wheel revolution rate signals in the brake motor ASIC are related to different wheels of the vehicle. Advantageously, the wheel revolution rate signals of each two wheel revolution rate sensors are processed in a respective ASIC. For example, the wheel revolution rate signals of sensors on the front wheels are processed in the system ASIC and the wheel revolution rate signals of sensors on the rear wheels are processed in the brake motor ASIC. The distribution of the wheel revolution rate signals to both ASICs ensures that even in the event of a failure, for example of the microcontroller, the brake motor can be automatically actuated by means of the brake motor ASIC.

According to yet another advantageous implementation, the automatic, speed-dependent actuation of the brake motor is carried out by means of the brake motor ASIC not only in the event of a failure of the microcontroller, but also in the event of a failure of the system ASIC and/or a failure of a communications interface between the microcontroller and the system ASIC or between the microcontroller and the brake motor ASIC. In an alternative implementation, it can however also be advantageous to maintain the regular brake function of the hydraulic vehicle brake without operating the electric brake motor even in the event of a failure of the system ASIC or a failure of a communications interface, as long as the microcontroller is still intact.

According to yet another advantageous implementation, at least one electronic H-bridge for actuating the electric brake motor is contained in the brake motor ASIC. In a preferred implementation, the brake motor ASIC comprises a number of electronic H-bridges corresponding to the number of electric brake motors. Thus, an electric brake motor can be actuated by means of the brake motor ASIC by means of a respective H-bridge. By means of the H-bridge, the relevant electric brake motor can be actuated in both directions, so that by means of the brake motor ASIC both the application of the brake motor to produce an electromechanical braking force and the release of the brake motor to reduce the electromechanical braking force can be carried out. The H-bridge can also be switched into a neutral position, in which the associated brake motor is switched off.

According to yet another advantageous implementation, the brake motor ASIC comprises a logic unit for detecting the switching state of an actuating switch, by means of which the electromechanical brake device can be manually switched on or off by the driver. The current switching state can be detected by means of the logic unit. Furthermore, the communications interface also advantageously operates via the logic unit for communications with the microcontroller or the logic unit forms a component of the communications interface to the microcontroller.

According to yet another advantageous implementation, motor angular position signals of the electric brake motor are also processed in the system ASIC in addition to the speed signals. The motor angular position signals originate from a motor angular position sensor, for example a Hall sensor, for determining the current angular position of the rotor shaft of the electric brake motor. In the case of a plurality of electric brake motors, accordingly a plurality of motor angular position signals are fed to the system ASIC. The motor angular position signals can be used in the microcontroller for variable actuation of the electric brake motors, for example by means of PWM actuation.

In an alternative implementation, motor angular position signals are dispensed with; in this case, the actuation is advantageously carried out continuously or quasi-continuously.

The logic unit in the brake motor ASIC can be designed in such a way that in the event of a failure of the microcontroller or in the event of a partial failure of the wheel revolution rate signals, by actuating the electric brake motor the vehicle is decelerated or a parking brake force is produced in the vehicle. In this case, a braking strategy that is adapted to the respective deceleration demand can be implemented using the measured motor current in the electric brake motor. For example, for the parking brake function and the permanent provision of a parking brake force that holds the vehicle at rest in connection with the switch-on peak of the motor current and the subsequent no-load current, the increase in the motor current associated with the build-up of force can be determined and the electric brake motor can be temporarily switched off to implement a staircase-shaped rising electromechanical braking force, wherein the braking force is maintained because of the self-locking. Thereupon, the brake motor is switched on again until the next force level is reached. This process is repeated until the parking brake force that is necessary for holding the vehicle at a standstill is reached in steps. PWM actuation may be carried out, in which the current increase is set that is responsible for the height of the steps in the braking force profile.

Furthermore, it is also possible to set a slip-dependent deceleration by means of the corresponding actuation of the electric brake motor. In this case, different wheel speeds are compared with each other. If a maximum slip is exceeded, the electric brake motor is released again until a lower slip threshold is reached. If on the other hand the slip is too low, the electric brake motor is actuated in the application direction to increase the braking force.

With the method for operating the brake system control device, in normal operation—with a working microcontroller—the actuation of all the active brake components is preferably carried out by means of the microcontroller by the corresponding generation of control signals. If for example a parking brake force is to be produced by means of the electric brake motor, then the microcontroller produces control signals that are fed via the communications interface to the brake motor ASIC, in which the electric brake motor is actuated accordingly.

In the event of a failure of the microcontroller on the other hand, the electric brake motor is automatically actuated in the brake motor ASIC to generate a braking force. This is carried out in particular depending on the speed, for which reason the wheel revolution rate signals that are present in the brake motor ASIC are processed.

BRIEF DESCRIPTION OF THE DRAWINGS

Further advantages and advantageous implementations are to be found in the further claims, the description of the figures and the drawings. In the figures:

FIG. 3 shows a function plan of a control device of the brake system with a hydraulic vehicle brake and an electromechanical brake device.

In the figures, identical components are given the same reference characters.

DETAILED DESCRIPTION

Figure 1:
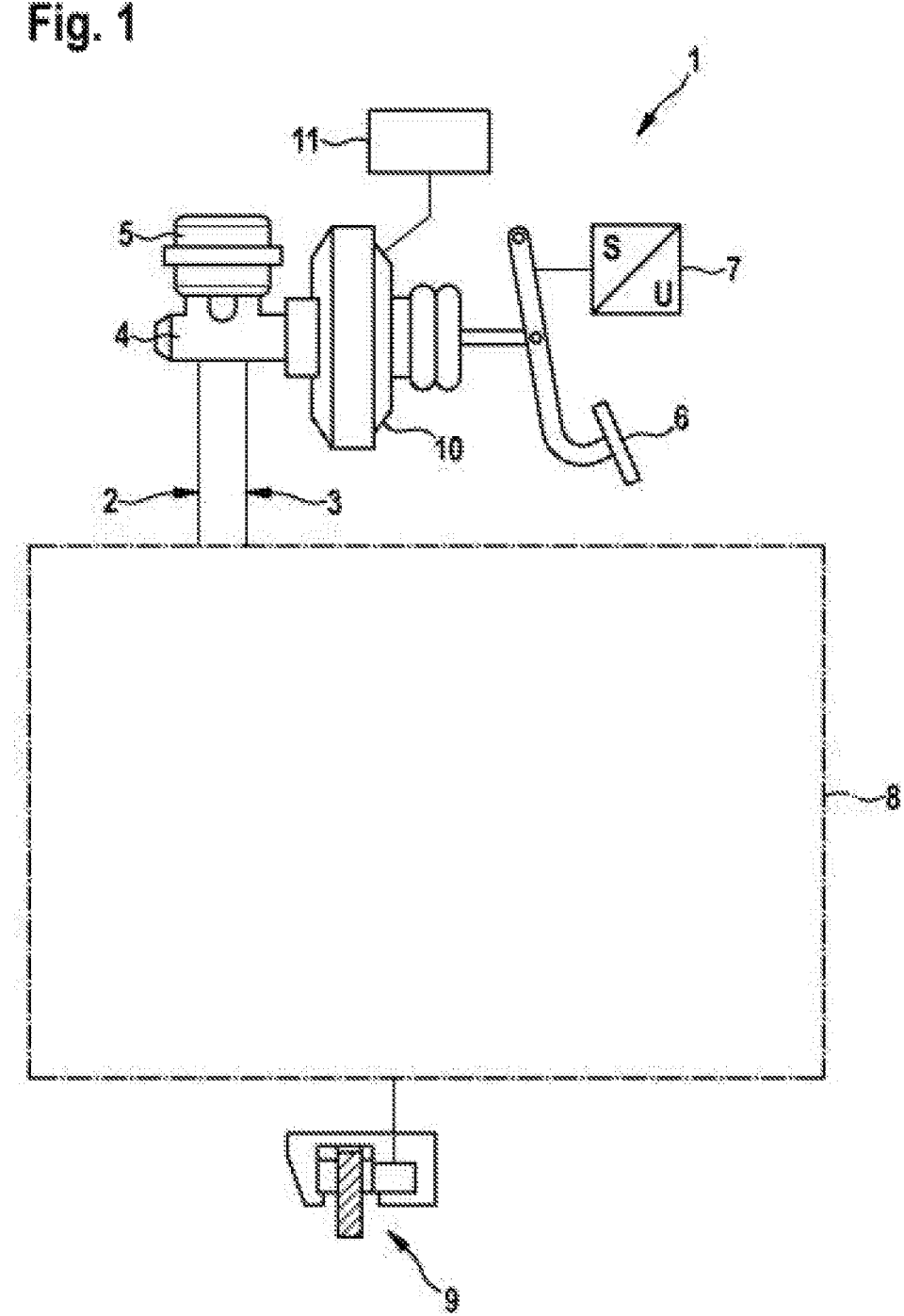
FIG. 1 shows a schematic representation of a hydraulic vehicle brake with a braking force booster, wherein the wheel brake devices of the vehicle brake on the rear axle of the vehicle are additionally fitted with an electromechanical brake device with an electric brake motor.

The hydraulic vehicle brake 1 for a vehicle that is represented in FIG. 1 comprises a front axle brake circuit 2 and a rear axle brake circuit 3 for supplying and actuating wheel brake devices 9 on each wheel of the vehicle with a brake fluid under hydraulic pressure. The brake circuits can also be embodied as two diagonal brake circuits, each with a front wheel and a rear wheel that is disposed diagonally thereto.

The two brake circuits 2, 3 are connected to a common master brake cylinder 4 that is supplied with brake fluid by means of a brake fluid reservoir container 5. The master brake cylinder piston within the master brake cylinder 4 is operated by the driver by means of the brake pedal 6, the pedal travel exerted by the driver being measured by means of a pedal travel sensor 7. Between the brake pedal 6 and the master brake cylinder 4 there is a braking force booster 10, which for example comprises an electric motor, which preferably actuates the master brake cylinder 4 by means of a gearbox (iBooster). The braking force booster 10 constitutes an active brake component for influencing the hydraulic brake pressure.

The actuation movement of the brake pedal 6 that is measured by the pedal travel sensor 7 is transmitted as a sensor signal to a control device 11 of the brake system, in which actuation signals for actuating the braking force booster 10 are produced. The supply of the wheel brake devices 9 with brake fluid is carried out in each brake circuit 2, 3 by means of different switching valves, which in common with further assemblies are part of brake hydraulics 8. The brake hydraulics 8 includes furthermore a hydraulic pump, which is a component of an electronic stability program (ESP). Also, the hydraulic pump is an active brake component for influencing the hydraulic brake pressure.

Figure 2:
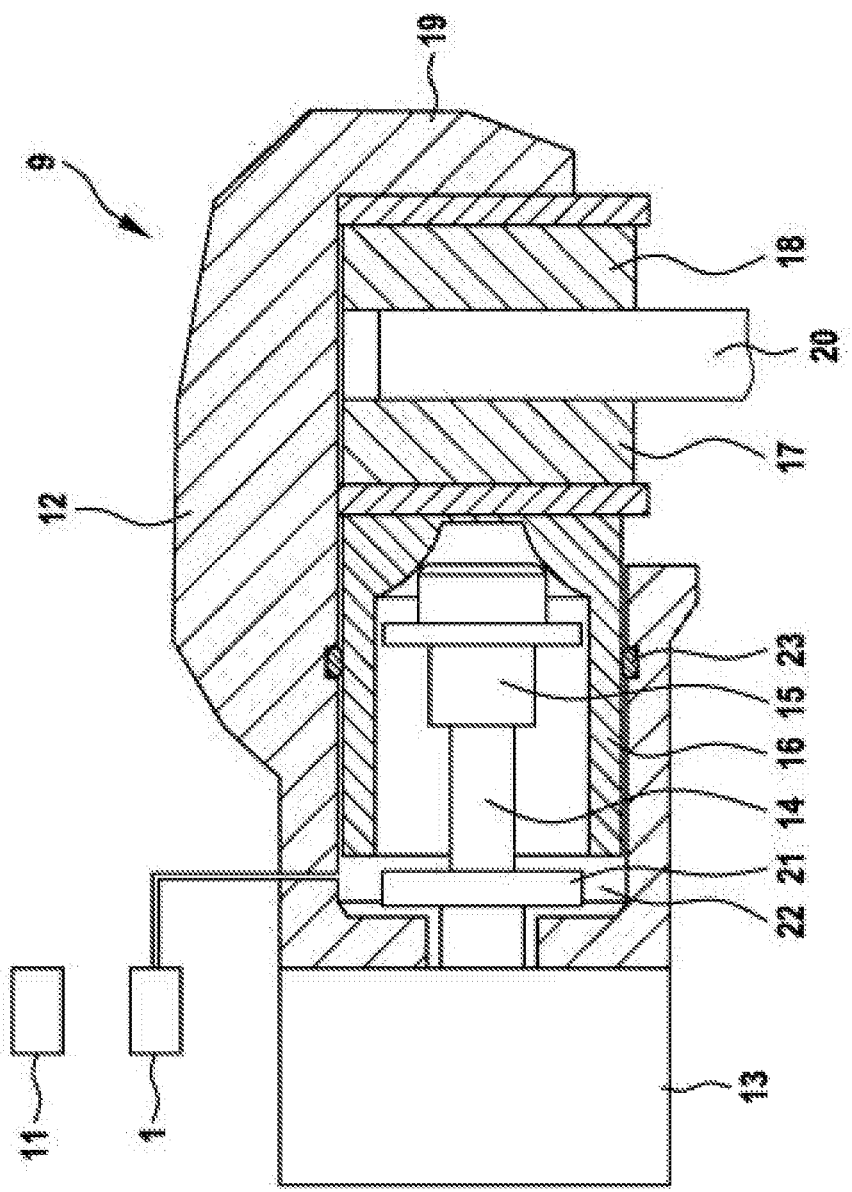
FIG. 2 shows a section through an electromechanical brake device with an electric brake motor.

In FIG. 2, the wheel brake device 9, which is disposed on a wheel on the rear axle of the vehicle, is represented in detail. The wheel brake device 9 is part of the hydraulic vehicle brake 1 and is supplied with brake fluid 22 from the rear axle brake circuit. Moreover, the wheel brake device 9 comprises an electromechanical brake device, which is preferably used as a holding brake for holding a vehicle at a standstill, but can also be used for decelerating the vehicle while the vehicle is moving, in particular at lower vehicle speeds below a speed limit value.

The electromechanical brake device comprises a brake caliper 12 with a claw 19 that overlaps a brake disk 20. As an actuating element the brake device comprises a motor-gearbox unit with a d. c. electric motor as the brake motor 13, the rotor shaft of which drives a spindle 14 rotationally, on which a spindle nut 15 is supported rotationally fixedly. During rotation of the spindle 14, the spindle nut 15 is displaced axially. The spindle nut 15 moves within a brake piston 16 that is the carrier for a brake lining 17 that is forced against the brake disk 20 by the brake piston 16. On the opposite side of the brake disk 20 there is a further brake lining 18, which is held positionally fixedly on the claw 19. The brake piston 16 is sealed pressure-tight on the outside thereof relative to the accommodating housing by means of an enveloping sealing ring 23.

The spindle nut 15 can move axially forwards within the brake piston 16 towards the brake disk 20 during a rotary motion of the spindle 14 or can move axially rearwards during an opposite rotary motion of the spindle 14 until reaching an end stop 21. To produce a clamping force the spindle nut 15 acts on the inner end face of the brake piston 16, whereby the brake piston 16, which is axially displaceably supported in the brake device, can be forced with the brake lining 17 against the facing end surface of the brake disk 20. The spindle nut 15 is a transmission element between the brake motor and the brake piston.

For the hydraulic braking force, the hydraulic pressure of the brake fluid 22 from the hydraulic vehicle brake 1 acts on the brake piston 16. The hydraulic pressure can also act in support during operation of the electromechanical brake device when the vehicle is at a standstill, so that the total braking force is made up of the electromotively provided component and the hydraulic component. Whilst the vehicle is travelling, either only the hydraulic vehicle brake is active, or both the hydraulic vehicle brake and the electromechanical brake device are active or only the electromechanical brake device is active in order to produce a braking force. The actuation signals for actuating both the adjustable components of the hydraulic vehicle brake 1 and the electromechanical wheel brake device 9 are produced in the control device 11.

In FIG. 3, a function plan of the control device 11 comprising a microcontroller 30, a system ASIC 31 and a brake motor ASIC 32 is represented. The microcontroller is connected to the system ASIC 31 by means of a communications interface SPI_1 and to the brake motor ASIC 32 by means of a further communications interface SPI_2.

In the system ASIC 31, wheel revolution rate signals W1 and W2, which originate from wheel revolution rate sensors on two wheels of the vehicle, are received and processed. Likewise, in the system ASIC 31 motor angular position signals H1 and H2 of Hall sensors on both electric brake motors of the electromechanical brake device are received and processed. The processed wheel revolution rate signals WA1 and WA2 and the processed motor angular position signals HA1 and HA2 are made available to the microcontroller 30.

The brake motor ASIC 32 comprises a logic unit 33 that communicates with the microcontroller 30 by means of the communications interface SPI_2. In the brake motor ASIC 32, further wheel revolution rate signals W3 and W4 are received that originate from further wheel revolution rate sensors on further vehicle wheels. For example, the wheel revolution rate signals W1 and W2 in the system ASIC 31 relate to the front wheels and the wheel revolution rate signals W3 and W4 in the brake motor ASIC relate to the rear wheels of the vehicle. The processed wheel revolution rate signals WA3 and WA4 are made available to the microcontroller 30 by the brake motor ASIC 32.

Moreover, the brake motor ASIC 32 contains two H-bridges 34 as electronic circuits, each of which is associated with an electric brake motor 13 of the electromechanical brake device. The H-bridges 34 are actuated by means of the brake motor ASIC 32 and control the functions of the electric brake motors 13, which depending on the actuation are operated to produce a braking force or are released or switched off to reduce a braking force.

The logic unit 33 of the brake motor ASIC 32 can detect the switching state of an actuating switch 35, with which the electromechanical brake device is manually switched on or off by the driver, and in the case of switching on the actuating direction of the electric brake motor is controlled. In the regular case, with a fully working microcontroller 30, to implement the parking brake for holding the vehicle at a standstill the parking brake is operated manually by the driver by means of the actuating switch 35, whereupon actuating signals for actuation of the electric brake motors 13 by means of the H-bridges 34 are produced in the brake motor ASIC 32 and the electric brake motors 13 are operated to produce an electromechanical braking force. In this case, the position of the actuating switch 35 is detected by means of the logic unit 33 and the result is provided to the microcontroller 30. In the microcontroller 30 the analysis of the driver's demand and the program procedure for actuating the brake motors 13 is carried out, wherein the result of the program for actuating the brake motors 13 is provided to the brake motor ASIC 32, which then actuates the brake motors 13 according to the information provided via the communications interface SPI_2. During the actuation, the measurement variables detected in the brake motor ASIC 30, in particular the current and voltage of the brake motors 13, are provided to the microcontroller 30 via the communications interface SPI_2. Thus, the program for controlling the brake motors 13 is informed about the state of the brake motors 13 at any point in time and can automatically stop the actuation again on reaching the setpoint brake force or the release distance.

In the event of a failure of the microcontroller 30, the functionality of the brake motor ASIC 32 is maintained, because the actuation of the electric brake motors 13 by means of the H-bridges 34 is carried out exclusively by means of the brake motor ASIC 32. It is thus also possible to activate the parking brake manually or automatically in the event of a failure of the microcontroller 30.

In order to avoid excessively low clamping forces, it can be advantageous to select a switch-off current in the clamping process that results in an adequate clamping force even under adverse voltage levels and brake motor temperatures.

Furthermore, in the event of a failure of the microcontroller 30 it is possible to use the electromechanical brake device with the brake motors 13 to produce a braking force when the vehicle is travelling in order to compensate for the failure of a hydraulic actuator, for example. In this case, the actuation of the electric brake motors is carried out depending on the speed, for which reason the speed information about the wheel revolution rate signals W3 and W4 is taken into account in the brake motor ASIC 32.

The invention claimed is:

1. A brake system control device for a vehicle with a hydraulic vehicle brake and with an electromechanical brake device with at least one electric brake motor, the brake system control device comprising:
   a microcontroller configured to actuate at least one active brake component of the hydraulic vehicle brake based on a sensor signal from a brake pedal travel sensor;
   a system application specific integrated circuit (ASIC) configured to detect first wheel revolution rate signals with respect to a first wheel, the first wheel revolution rate signals being provided to the microcontroller from the system ASIC;
   a brake motor ASIC configured to actuate the at least one electric brake motor of the electromechanical brake device and detect second wheel revolution rate signals with respect to a second wheel, the second wheel revolution rate signals being provided to the microcontroller from the brake motor ASIC; and
   communication interfaces configured to connect the microcontroller to the system ASIC and the brake motor ASIC,
   wherein the brake motor ASIC is configured to actuate the at least one electric brake motor to produce a braking force in response to an activation signal received from the microcontroller,
   wherein the brake motor ASIC is configured to actuate the at least one electric brake motor to produce a braking force based on the second wheel revolution rate signals in response to a failure of at least one of (i) the microcontroller, (ii) the system ASIC, and (iii) the communication interfaces that connect the system ASIC and the brake motor ASIC to the microcontroller.

2. The control device as claimed in claim 1, wherein the first wheel revolution rate signals detected by the system ASIC and the second wheel revolution rate signals detected by the brake motor ASIC relate to different wheels of the vehicle.

3. The control device as claimed in claim 1, further comprising:
   at least one electronic H-bridge included in the brake motor ASIC and configured to actuate the at least one electric brake motor.

4. The control device as claimed in claim 1, further comprising:
   a logic unit integrated within the brake motor ASIC and configured to detect a switching state of a manual parking brake switch, the switching state being provided to the microcontroller from the brake motor ASIC, the microcontroller providing the activation signal to the brake motor ASIC depending on the switching state.

5. The control device as claimed in claim 4, wherein the logic unit is further configured to calculate a speed of the vehicle from the second wheel revolution rate signals.

6. The control device as claimed in claim 1, wherein the system ASIC is further configured to detect motor angular position signals of the at least one electric brake motor.

7. A method for operating a brake system control device including a microcontroller, a system application specific integrated circuit (ASIC), and a brake motor ASIC, the method comprising:
   producing control signals for actuating at least one active brake component of the vehicle in the microcontroller based on a sensor signal from a brake pedal travel sensor;
   detecting first wheel revolution rate signals with respect to a first wheel with the system ASIC, the first wheel revolution rate signals being provided to the microcontroller from the system ASIC;
   detecting second wheel revolution rate signals with respect to a second wheel with the brake motor ASIC, the second wheel revolution rate signals being provided to the microcontroller from the brake motor ASIC; and
   actuating at least one electric brake motor of the vehicle using the brake motor ASIC to produce a braking force in response to an activation signal received from the microcontroller,
   actuating the at least one electric brake motor using the brake motor ASIC to produce a braking force based on the second wheel revolution rate signals in response to a failure of at least one of (i) the microcontroller, (ii) the system ASIC, and (iii) communication interfaces that connect the system ASIC and the brake motor ASIC to the microcontroller.

8. A brake system in a vehicle, the brake system comprising:
   a hydraulic vehicle brake having at least one active brake component;
   an electromechanical brake device having at least one electric brake motor; and
   a control device configured to actuate adjustable brake system components of the brake system, the control device including:
      a microcontroller configured to actuate the at least one active brake component based on a sensor signal from a brake pedal travel sensor;
      a system application specific integrated circuit (ASIC) configured to detect first wheel revolution rate signals with respect to a first wheel, the first wheel revolution rate signals being provided to the microcontroller from the system ASIC;
      a brake motor ASIC configured to actuate the at least one electric brake motor of the electromechanical brake device and detect second wheel revolution rate signals, the second wheel revolution rate signals being provided to the microcontroller from the brake motor ASIC; and
      communication interfaces configured to connect the microcontroller to the system ASIC and the brake motor ASIC,
      wherein the brake motor ASIC is configured to actuate the at least one electric brake motor to produce a braking force in response to an activation signal received from the microcontroller,
      wherein the brake motor ASIC is configured to actuate the at least one electric brake motor to produce a braking force based on the second wheel revolution rate signals in response to a failure of at least one of (i) the microcontroller, (ii) the system ASIC, and (iii) the communication interfaces that connect the system ASIC and the brake motor ASIC to the microcontroller.

9. The brake system as claimed in claim 8, wherein the at least one active brake component is an electric motor fitted in the hydraulic vehicle brake and configured to influence a hydraulic pressure.

10. The brake system as claimed in claim 8, wherein the at least one electric brake motor is fitted in at least one wheel brake device on a rear axle of the vehicle.

\* \* \* \* \*